AMMONIUM NITRATE SLURRY COMPOSITION OF LOW CRYSTALLIZATION POINT AND METHOD OF PREPARATION

Original Filed Feb. 25, 1964

INVENTORS
ROBERT B. CLAY
LEX L. UDY

BY Edwin M. Thomas
Attorney

United States Patent Office

Re. 26,804
Reissued Feb. 24, 1970

26,804

AMMONIUM NITRATE SLURRY COMPOSITION OF LOW CRYSTALLIZATION POINT AND METHOD OF PREPARATION

Robert B. Clay, Bountiful, and Lex L. Udy, Salt Lake City, Utah, assignors to Intermountain Research and Engineering Company, a corporation of Utah Original No. 3,249,476, dated May 3, 1966, Ser. No. 347,273, Feb. 25, 1964. Application for reissue May 29, 1967, Ser. No. 661,133

Int. Cl. C06b *1/04;* C06d *5/00*

U.S. Cl. 149—38 11 Claims

Matter enclosed in heavy brackets [ ] appears in the original patent but forms no part of this reissue specification; matter printed in italics indicates the additions made by reissue.

*ABSTRACT OF THE DISCLOSURE*

*An explosive slurry, based primarily on a concentrated aqueous solution of ammonium nitrate, and containing a sensitizer, has its "fudge point" or temperature point of congelation on cooling, altered by addition of a salt, such as sodium nitrate, potassium nitrate, calcium nitrate, sodium perchlorate, ammonium perchlorate, lithium perchlorate, calcium cyanamide, urea, and/or mixtures thereof, to flatten its temperature-sensitivity curve. This makes it possible to deliver the slurry, still in liquid form, through a conduit without starting out at high temperature, thereby reducing hazards. The sensitizer may be particulate aluminum, TNT, nitrocellulose, or mixtures.*

Figure 1:
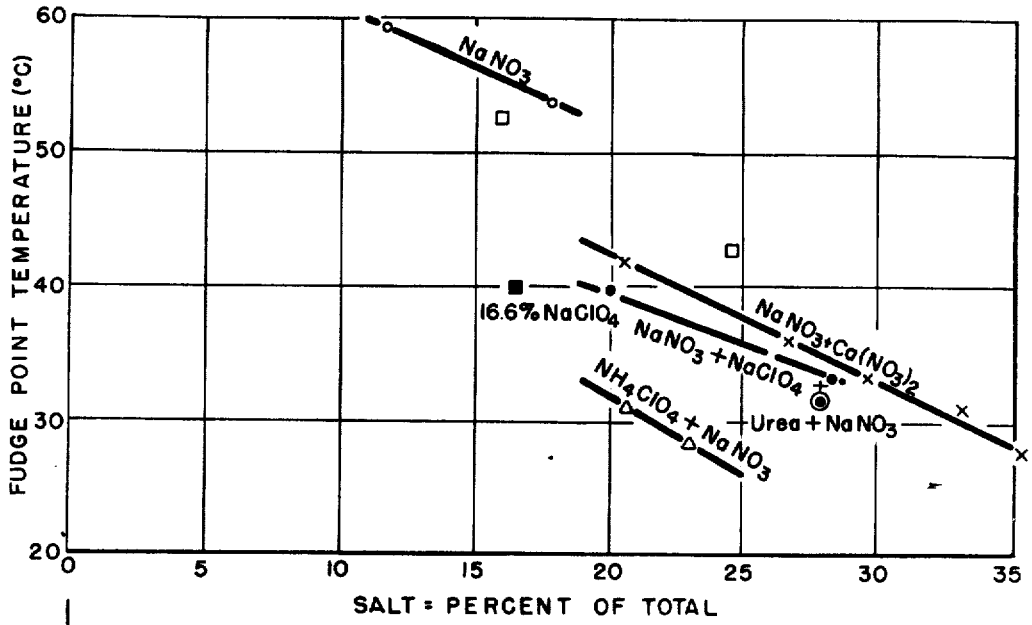

The present invention relates to an improved explosive composition of low crystallization point and to a method for its preparation. It has to do particularly with slurry type explosives which contain water soluble salts that tend to crystallize or salt out as the operating or using temperature is lowered.

In recent years important advantages have been gained by the use of slurry type explosives. These materials frequently contain large proportions of ammonium nitrate, along with other ingredients such as fuels and oxidizers, plus materials added to control their sensitivity and, in some cases, additives having still other properties. Slurry type explosives have several commercial advantages. They are comparatively inexpensive to prepare, relatively safe to use and they can be readily placed in situ at the point of use, for example, by pouring, pumping or otherwise inserting the plastic or liquid mixture into the borehole or other place where detonation is to take place. Properly used, they have high space efficiency, that is to say that boreholes obviously can be filled more completely with liquid material than with solids.

In the past, slurry explosives of the ammonium nitrate type have frequently been prepared by mixing hot aqueous ammonium nitrate solutions of fairly high concentration with the other ingredients which are normally dry. After mixing, such compositions are still at elevated temperature. The hot, or at least moderately heated, aqueous dispersion or slurry so made can often be used under conditions where a cooler fluid could not be employed. A starting material having appropriate concentration which is often used for such purposes involves a simple aqueous solution of ammonium nitrate containing about 83% to 87% of the salt, the remainder being water. For such concentration, the liquid must be kept hot. In a typical heated 85/15 ammonium nitrate-water solution (by weight) the ammonium nitrate will begin to salt out when the temperature is lowered to about 76.7° C. That is, crystals of the ammonium nitrate begin to form in the solution at this temperature. At temperatures below this value the crystals grow, and become rapidly segregated from the solution. The remainder of the true solution becomes more dilute, that is, the ratio of dissolved ammonium nitrate to water decreases. The temperature at which this crystallization or salting out Operations at the elevated temperatures required to prevent crystallization of ammonium nitrate from its solution have several disadvantages. First, the temperature of the final mixture of slurry explosive remains relatively high, even after the dry ingredients, including fuels and sensitizers, are added. Aqueous ammonium nitrate per se is safe enough to handle, even at high *temperature* [temperture], but this is not so when sensitizers or fuels are added. Since the final composition may contain, in addition to the sodium nitrate, such materials as TNT, nitro-cellulose explosives or the like, as well as other materials, it is relatively very sensitive to detona- begins in an explosive mixture is commonly called the "fudge point." At a temperature of approximately 65° C., or about 10° below the fudge point or crystallization point, an ammonium nitrate 85/15 solution becomes so thick that it is difficult and usually quite impractical to handle in the desired fluid or slurry form. Hence, in actual practice, for mixing and handling slurry compositions based on ammonium nitrate solutions in water, it has been found desirable and even necessary to keep the temperature of the solution about 5° to 10° above the fudge point until the explosive is in the borehole. This is required in order that fluidity may be maintained in the slurry throughout the mixing and loading process. Such process involves the steps of metering the liquid, mixing with the dry ingredients which are to be incorporated into the ammonium nitrate solution before it is used, and dispensing into a borehole or into a container to be used later. All these steps must be carried out without too much crystallization or fudging of the salt.

tion, particularly at elevated temperatures. It is therefore dangerous to use at higher temperatures.

For example, a typical slurry of this type may contain small proportions of aluminum powder as a sensitizer. Such a slurry may detonate with as small a detonator as a standard No. 8 electric blasting cap. This applies to a 3-inch diameter unconfined charge at 75° C. The same slurry, when cooled to 60° C. is much safer. It cannot be detonated at all at this lower temperature with a number 8 cap. Detonation of the same charge at 60° C. requires at least a small amount of a high pressure explosive booster for initiation.

When slurry explosives of this type are cooled to temperatures near the normal freezing point of water, on the other hand, for example, around 0° to 5° C., the slurry explosive often becomes too insensitive. A charge like that just described cannot be initiated and sustained, even by a large high pressure explosive booster, in a 6-inch diameter unconfined charge. Such compositions, therefore, are virtually useless for their intended purposes at temperatures near or below freezing.

It is obvious that a composition having a lower fudge point, or temperature of crystallization, will permit a lower final temperature of making up the slurry composition at or near the point of use. Such could be obtained by using a lower concentration of ammonium nitrate but this reduces the power of the explosive. It obviously is very desirable to be able to provide greater sensitivity at low temperatures and still avoid undue sensitivity at higher temperatures. This result could be achieved if the slurry could be made up at near normal temperatures in the field without loss of power in the blast. If the liquid solution of the nitrate salt could be prevented from crystallizing or fudging at the working or ambient temperature without the loss of energy in the final slurry, such a result could be achieved.

An object of this invention, therefore, is to lower the fudge point or crystallization point of the main liquid which is used to make up slurry type explosive compositions, without substantial loss of energy in the final composition. A related object is to provide a more desirable and detonable but less sensitive explosive or blasting agent under ordinary conditions of use with all its obvious advantages of safety. This is accomplished, according to the present invention, by substituting in the primary liquid, a material which will lower the fudge point but will also replace the energy of the displaced ammonium nitrate.

Secondly, for field operations, i.e., where dry ingredients such as sensitizers are to be incorporated into concentrated aqueous solutions of ammonium nitrate in the field, it requires considerable heat and is inconvenient and expensive to keep the salt in solution. This is particularly true when one seeks to make up a slurry at the elevated temperatures ordinarily employed in the practice described above. In cool or cold weather, obviously a tank solution in a field truck, for example, cannot be kept at a temperature of 70° to 80° C. or so for any length of time without a substantial and continuing input of heat. A liquid material suitable for slurry formation, which has adequate energy content and which can adequately be mixed and processed with a lower fudge point or crystallization temperature, obviously will result in substantial savings in heat and heating equipment. Otherwise heating must be practiced in the field. To reduce the heating temperature required, and thereby to obtain substantial savings in field operations is a further object of this invention. In some cases heating can be eliminated altogether.

Thirdly, at high temperatures, the corrosive effects of the ammonium nitrate solution, as modified by the other ingredients which may be added thereto, usually become much more pronounced than at lower temperatures. This increase of corrosion with rising temperature is of course a well known general phenomenon. The equipment used to make and proces the slurry type explosive compositions, including pumping machinery or equivalent equipment to move the plastic or liquid explosives into the bore holes or into packages, or to other points of use, is subject to serious corrosion and damage on exposure at elevated temperature, for prolonged time periods, to salt solutions of this general type. Temperature reduction without reaching the fudge point, can only be achieved by a change of ingredients in the liquid used to make the slurry. It is, therefore, still a further object of this invention to provide an improvement in the combination of ingredients, and/or proportions of ingredients used in the starting liquid employed for making compositions of the slurry type. At the same time, by this invention, it is possible to retain the desirable convenience of slurry explosives, while avoiding corrosion to equipment. This reduction of corrosion may be accomplished to a large degree, and very simply, by reducing the temperature at which this material is employed, when the composition is appropriate for such temperature reduction. Such reduction of corrosion makes it possible, therefore, to extend the life of mixing and dispensing equipment or, alternatively, to use less expensive although less corrosive-resistant materials than must be employed under present practices.

Fourthly, the hazarads of mixing, handling, and dispensing of hot ammonium nitrate solution, with damage of splashing, spilling, etc. or considerable, aside from the danger of detonation, etc. These hazards involve risks to health of operators which are considerably more serious than are involved in using a cooler solution. An additional object, then, is to reduce such hazards.

To accomplish the objects described above, and others which are inherent though not specifically stated, it has now been found that the crystallization temperature or fudge point of nitrate salt solutions and compositions derived therefrom may be reduced effectively by substition of minor proportions of alternative ingredients. By such means the slope of the solubility curve, which defines the crystallization point of an aqueous salt composition, may be modified very considerably. By this means, it becomes possible largely to avoid the problems mentioned above. This is accomplished, according to the present invention, by adding various water soluble ingredients to the aqueous solution, i.e., ingredients which can be dissolved quite independently of the ammonium nitrate and which, while replacing a minor proportion of the ammonium nitrate salt, do not reduce the potency or energy content of the finished explosive. A number of such materials are available, although some of them have certain advantages over others. The most desirable appear to be oxidizer materials well known in the explosives art, such as sodium nitrate, potassium nitrate, lithium perchlorate, sodium perchlorate and, in some cases, urea. It is considered less desirable, however, to add materials which primarily have only fuel value, such as urea, because dry fuels are available for separate addition and oxidizer concentration must be maintained for efficient blasting. However, such additions, even of materials which are primarily fuels, may be valuable in some applications, because of the distinct fudge point lowering effect of such material. Urea is very effective in this respect and can sometimes be used despite the fact that it is primarily of value as a fuel.

In Table I below are listed a number of combinations of ingredients with an indication of their effect on the fudge or crystallization point:

TABLE I
Composition Percent

| $H_2O$ | $NH_4NO_3$ | $NaNO_3$ | $NaClO_4$ | $NH_4ClO_4$ | $KNO_3$ | $Ca(NO_3)_2$ | $CaCN_2$ | Urea | Fudge Pt., ° C. |
|---|---|---|---|---|---|---|---|---|---|
| 15 | 85 | -------- | -------- | -------- | -------- | -------- | -------- | -------- | 77 |
| 20 | 80 | -------- | -------- | -------- | -------- | -------- | -------- | -------- | 59 |
| 25 | 75 | -------- | -------- | -------- | -------- | -------- | -------- | -------- | 43 |
| 20.6 | 61.8 | 17.6 | -------- | -------- | -------- | -------- | -------- | -------- | 45 |
| 17.6 | 70.6 | 11.8 | -------- | -------- | -------- | -------- | -------- | -------- | 59 |
| 17.6 | 64.7 | 17.6 | -------- | -------- | -------- | -------- | -------- | -------- | 54 |
| 16.7 | 66.6 | 11.1 | 5.5 | -------- | -------- | -------- | -------- | -------- | 53 |
| 24.9 | 58.5 | -------- | 16.6 | -------- | -------- | -------- | -------- | -------- | 40 |
| 21.4 | 50.0 | 14.3 | 14.3 | -------- | -------- | -------- | -------- | -------- | 33 |
| 20.6 | 48 | 20.6 | 10.9 | -------- | -------- | -------- | -------- | -------- | 62 |
| 20 | 60 | 17 | 3 | -------- | -------- | -------- | -------- | -------- | 40 |
| 19.6 | 58.8 | 16.7 | 4.9 | -------- | -------- | -------- | -------- | -------- | 38 |
| 19.2 | 57.6 | 16.3 | 6.7 | -------- | -------- | -------- | -------- | -------- | 39 |
| 18.9 | 56.6 | 16 | 8.5 | -------- | -------- | -------- | -------- | -------- | 43 |
| 18.5 | 55.5 | 15.7 | 10.2 | -------- | -------- | -------- | -------- | -------- | 45 |
| 18.2 | 54.5 | 15.5 | 7.3 | -------- | -------- | 4.5 | -------- | -------- | 44 |
| 19.6 | 58.8 | 16.7 | -------- | -------- | -------- | 4.9 | -------- | -------- | 42 |
| 18.3 | 55.0 | 15.6 | -------- | -------- | -------- | 11.0 | -------- | -------- | 36 |
| 17.5 | 52.6 | 14.9 | -------- | -------- | -------- | 14.9 | -------- | -------- | 34 |
| 16.8 | 50.4 | 14.3 | -------- | -------- | -------- | 18.5 | -------- | -------- | 32 |
| 16.1 | 48.4 | 13.7 | -------- | -------- | -------- | 21.8 | -------- | -------- | 28 |
| 14.9 | 44.8 | 12.7 | -------- | -------- | -------- | 27.6 | -------- | -------- | 24 |
| 13.0 | 39.0 | 11.0 | -------- | -------- | -------- | 37.0 | -------- | -------- | 23 |
| 16.7 | 66.7 | 11.1 | -------- | -------- | -------- | -------- | 5.6 | -------- | 50 |
| 16.7 | 66.7 | 11.1 | -------- | -------- | 5.6 | -------- | -------- | -------- | 60 |
| 15.8 | 63.1 | 10.5 | -------- | -------- | 10.5 | -------- | -------- | -------- | 61 |
| 22.7 | 56.8 | 18.2 | -------- | 2.3 | -------- | -------- | -------- | -------- | 31 |
| 22 | 55 | 17.6 | -------- | 5.5 | -------- | -------- | -------- | -------- | 28 |
| 17.4 | 54.6 | 16.3 | -------- | -------- | -------- | -------- | -------- | 11.6 | 32 |
| 15 | 60 | 10 | 10 | -------- | -------- | -------- | -------- | 5 | 40 |
| 14.3 | 57.1 | 9.5 | 9.5 | -------- | -------- | -------- | -------- | 9.5 | 34 |

Figure 2:
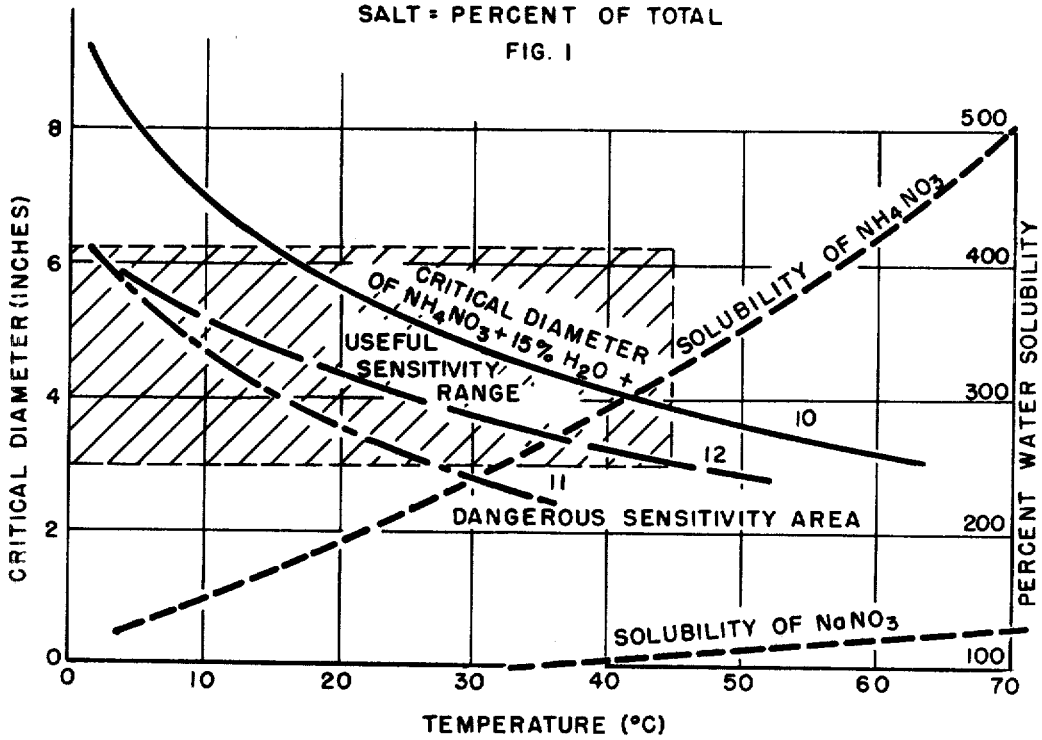

The drawing shows some of the results of using mixtures of Table I. In the drawing, FIGURE 1 is a graph showing the fudge point or crystallization temperature of mixtures of relatively low water content, i.e. usually below 20% of the total slurry composition. FIGURE 2 shows graphically certain critical diameter characteristics of slurry explosives and, at the right, also shows the composition water solubilities of ammonium nitrate and sodium nitrate at various temperatures.

Referring first to FIGURE 1, it will be noted that the top curve represents the fifth and sixth items in Table I and shows that, for a composition containing 17.6% water, the fudge point is reduced by increased replacement of $NH_4NO_3$ with $NaNO_3$. This is surprising in view of the fact that the sodium salt has a much lower solubility over the same temperature than the ammonium salt, as shown at the right in FIGURE 2.

The second curve in FIGURE 1 shows that a combination of sodium nitrate and calcium nitrate to replace part of the ammonium nitrate is even more effective than sodium nitrate. It must be noted, however, that calcium nitrate is a less potent ingredient than the ammonium or the sodium salt. See the first, third and fifth compositions of those containing $Ca(NO_3)_2$, Table I.

The next curve shows the results of using a combination of sodium nitrate and sodium perchlorate to replace part of the ammonium nitrate. A single point shows use of 11.6% urea with 16.3% of sodium nitrate, the water content of this mixture being 17.4% by weight.

A single point in the center of FIGURE 1 shows the results of using a substantial quantity of sodium perchlorate, 16.6%, without any sodium nitrate, to replace part of the ammonium nitrate. Water content, however, was rather high, 24.9% by weight and the fudge point, to 40° C. was only moderately lower than the 25/75 water-ammonium nitrate solution, third item in Table I, which was 43° C.

Finally, FIGURE 1 shows a rather dramatic lowering of the fudge point with a combination of ammonium perchlorate and sodium nitrate. See the two compositions under the $NH_4ClO_4$ heading in Table I. Note, however, that the water content of this mixture was somewhat higher 22.7 and 22%) than that of most of the other compositions listed in the table. For best results, the water content should be kept as low as possible, consistent with other requirements such as slurry fluidity, etc. A water content of around 15% is highly desirable, and it should usually be below 20% of the weight of the total slurry, preferably below 18%. However, when energy-giving materials can be included e.g., in solution without reducing the fluidity, the water content may in some cases be permitted to go above 20%, in some extreme cases as high as 25%.

Now, referring to FIGURE 2, there is illustrated graphically one of the major problems associated with slurry explosives based mainly on ammonium nitrate. That is their marked tendency to high sensitivity at warmer temperatures and low sensitivity near the freezing point, 0° C. The upper curve 10 at the left shows this characteristic. Using the critical diameter as a criterion of sensitivity, i.e. the diameter below which cylindrical charge will not sustain and transmit a detonation in a long column, it will be noted that the critical diameter, $d_c$ is above 6″ at about 16° C. The value of $d_c$ can of course be reduced by adding sensitizers such as TNT, aluminum powder, cellulose nitrate and the like, but when this is done, the curve is merely lowered and its slope is not substantially changed. This is indicated in the lower curve 11 at the left. The ideal, of course, would be to find an explosive which has the same critical diameter, i.e. the same sensitivity at all working temperatures, but this ideal has not been achieved.

According to the present invention, however, the ideal is approached by the expedient of adding to the ammonium nitrate concentrate one or more of the modifiers which lowers its fudge point. Then with appropriate sensitizers these materials may be brought into the desired sensitivity range at temperatures near the freezing point of water and still not be unduly sensitive for use in summer temperatures. This general result is indicated by the intermediate curve 12 of FIGURE 2. The shaded area shows the desirable sensitivity range at temperatures from 0° to 45° C. In effect, the slope of the normal ammonium nitrate curve (in 15% of water) is substantially reduced or flattened. By a judicious choice of solubility modifiers, according to this invention, slurry explosives may be premixed and, if desired, prepackaged, without too much concern for the temperature at which they are to be employed. This represents a radical departure from past practices.

In general terms, then, the present invention takes advantage of the fact that one may replace part of a highly soluble salt, in a saturated or near-saturated solution, with another salt which may be less soluble per se but which can go into solution to such an extent, in the face of the highly soluble salt, as to increase the overall salt content of the solution. Or conversely, the fudge point or crystallization point temperature can be lowered without loss of total salt content or even with increased total salt content. The invention is particularly applicable to the replacement of a minor proportion of the ammonium nitrate in a near-saturated solution with another salt which is an energetic explosive ingredient. The invention also contemplates, of course, the use of a plurality of salts in various combinations to replace part of the ammonium nitrate conventionally used in saturated or nearly saturated aqueous solutions which form the basis of slurry type blasting agents.

It is particularly preferred to replace about 2% to 40% of the normally used $NH_4NO_3$ with the substitute salt or salt combination for the purpose of lowering the crystallization temperature (fudge point) and the preferred agents for this purpose, referred to in the claims as "salts," are selected from the group which consists of sodium nitrate, potassium nitrate, calcium nitrate, ammonium perchlorate, sodium perchlorate, urea and calcium cyanamide. Other and equivalent materials which contribute to good explosive energy and which are water soluble and otherwise compatible with the ammonium nitrate will suggest themselves to those skilled in the art. Obviously the slurry composition will normally contain other ingredients which are not water soluble, or which have low water solubility. Examples of these include pulverized or granulated TNT, cellulose nitrate, sulfur, aluminum and other active sensitizing metals and the like.

It will be apparent that various modifications may be made and will suggest themselves to those skilled in the art. It is intended by the claims below to cover such modifications as broadly as the state of the prior art properly permits.

What is claimed is:

[1. An explosive slurry composition comprising an aqueous solution of salt comprising a major proportion of ammonium nitrate and a lesser proportion of another salt combined with the ammonium nitrate in the actual initial solution which has a substantial explosive energy and which by reason of being in solution lowers the crystallization temperature of said solution below the point where a solution of like total concentration of ammonium nitrate would crystallize, said slurry containing enough of said solution to render it at least plastic and pourable.]

[2. An explosive composition comprising a liquid carrier and finely divided solids slurried but not fully dissolved therein, said liquid carrier comprising a concentrated aqueous solution of salt, the salt comprising a major proportion of ammonium nitrate and a lesser proportion of at least one salt selected from the group which consists of sodium nitrate, potassium nitrate, calcium nitrate, sodium perchlorate, ammonium perchlorate, calcium cyanamide and urea, the first said lesser proportion being so selected as to lower the crystallization temperature of the aqueous solution below the crystallization temperature it would have if its total salt content were ammonium nitrate.]

[3. Composition according to claim 2 wherein the lesser proportion salt is at least partly sodium nitrate.]

[4. Composition according to claim 2 wherein the undissolved solids comprise a material which is explosive per se.]

[5. Composition according to claim 4 wherein the explosive material comprises TNT.]

[6. Composition according to claim 4 wherein the explosive material comprises cellulose nitrate.]

[7. Composition according to claim 2 wherein the undissolved solids comprise aluminum powder.]

[8. The process of preparing a slurried explosive composition based primarily on a concentrated aqueous solution of a highly soluble nitrate salt, which comprises replacing a minor part of the highly soluble salt with a salt which contributes explosive energy and which lowers the crystallization temperature of the aqueous solution below that which it would have if the entire salt content of the concentrated solution were the nitrate, and thereafter blending into said liquid additional dry ingredients to contribute to the explosive qualities of the composition and to form a substantial stable slurry.]

[9. Process according to claim 8 wherein the soluble nitrate is ammonium nitrate.]

[10. Process according to claim 8 wherein the soluble nitrate is ammonium nitrate and the crystallization lowering salt is at least one of the group which consists of sodium nitrate, potassium nitrate, calcium nitrate, sodium perchlorate, ammonium perchlorate, calcium cyanamide and urea.]

[11. Composition according to claim 1 wherein the solution contains a sensitizer and more total salt than the water present could dissolve of ammonium nitrate at the temperature of use.]

[12. Composition according to claim 1 which contains enough aluminum powder to make it cap-sensitive in 3-inch diameter at 75° C.]

[13. The method of flattening the temperature-sensitivity curve of sensitized aqueous ammonium nitrate slurry explosives which comprises replacing a minor part of the ammonium nitrate in actual solution by a highly water soluble salt, at least a part of which is sodium nitrate.]

[14. Method according to claim 13 wherein there is added to the solution a perchlorate in addition to sodium nitrate.]

*15. The process of preparing and delivering to a borehole a slurried explosive composition based primarily on a concentrated aqueous solution of ammonium nitrate under conditions which flatten the temperature-sensitivity curve of the slurry, which comprises replacing a minor part of the ammonium nitrate in the concentrated aqueous solution with a salt which contributes explosive energy and lowers the crystallization temperature of the aqueous solution below that which it would have if the entire salt content thereof were ammonium nitrate, thereafter forming a liquid slurry mixture by blending into said solution dry ingredients including at least one sensitizer to contribute to the explosive qualities of the composition while said solution is at a temperature above its fudge point to maintain fluidity but below the crystallization temperature it would have if the entire salt content were ammonium nitrate, and dispensing the substantially stable slurry thus formed into a borehole while the slurry is in fluid condition.*

*16. The process according to claim 15 wherein the crystallization temperature lowering salt is selected from the group consisting of sodium nitrate, potassium nitrate, calcium nitrate, sodium perchlorate, ammonium perchlorate, lithium perchlorate, calcium cyanamide, urea and mixtures thereof.*

*17. The process according to claim 15 wherein the sensitizer is selected from the group consisting of aluminum, TNT, cellulose nitrate and mixtures thereof.*

*18. The process according to claim 15 wherein the crystallization temperature-lowering salt is sodium nitrate.*

*19. The process according to claim 15 wherein the crystallization temperature—lowering salt consists of a mixture of a perchlorate salt and sodium nitrate.*

*20. The process according to claim 18 wherein the sensitizer is aluminum.*

*21. The process according to claim 15 wherein the sensitizer comprises TNT.*

*22. The process according to claim 15 wherein the sensitizer comprises nitrocellulose.*

*23. The process of preparing a slurried explosive composition based primarily on a concentrated aqueous solution of a highly soluble oxidizer salt at least part of which is ammonium nitrate, which comprises replacing a minor part of the highly soluble salt with a salt which contributes explosive energy and which lowers the crystallization temperature of the aqueous solution below that which it would have if the entire salt content thereof were ammonium nitrate, thereafter forming a liquid slurry mixture by blending into said solution dry ingredients including at least one sensitizer to contribute to the explosive qualities of the composition while said solution is at a temperature above its fudge point to maintain fluidity but below the crystallization temperature it would have if the entire salt content were ammonium nitrate, and dispensing the substantially stable slurry thus formed into a borehole while the slurry is in fluid condition.*

*24. The method of preparing and using an ammonium nitrate based slurry, including flattening the temperature-sensitivity curve of sensitized aqueous ammonium nitrate slurry explosives, which comprises replacing a minor part of the ammonium nitrate in actual solution by a highly water soluble salt, at least a part of which is sodium nitrate, sensitizing the slurry at a temperature below that at which crystallization of a comparably concentrated simple solution of ammonium nitrate would occur, by adding sensitizing particles thereto, and moving the slurry to a delivery point before substantial crystallization of fudging of salt in the slurry occurs.*

*25. Method according to claim 24 wherein there is added to the solution a perchlorate in addition to sodium nitrate.*

References Cited

The following references, cited by the Examiner, are of record in the patented file of this patent or the original patent.

UNITED STATES PATENTS

| | | | |
|---|---|---|---|
| 2,548,693 | 4/1951 | Whetstone et al. | 149—46 X |
| 3,121,036 | 2/1964 | Cook et al. | 149—43 X |
| 3,129,126 | 4/1964 | Carlevato | 149—43 X |
| 3,153,606 | 10/1964 | Breza et al. | 149—41 |

BENJAMIN R. PADGETT, Primary Examiner

U.S. Cl. X.R.

86—23; 102—23; 149—39, 41, 42, 43, 44, 46, 48, 56, 63, 69